United States Patent Office 3,707,466
Patented Dec. 26, 1972

3,707,466
CLARIFICATION OF AQUEOUS SUSPENSIONS WITH OXYALKYLATED POLYACRYLAMIDE FLOCCULATING AGENTS
Elmar Reinwald, Dusseldorf-Wersten, and Joachim Galinke, Dusseldorf-Holthausen, Germany, assignors to Hendel & Cie G.m.b.H., Dusseldorf-Holthausen, Germany
No Drawing. Filed Apr. 21, 1971, Ser. No. 136,205
Claims priority, application Germany, Apr. 29, 1970, P 20 21 006.4
Int. Cl. B01d 21/01
U.S. Cl. 210—52   10 Claims

ABSTRACT OF THE DISCLOSURE

A process of clarification of aqueous suspensions consisting of contacting an aqueous suspension with an oxyalkylated polyacrylamide in order to form a floc and separating clarified water from said floc.

THE PRIOR ART

In the clarification of aqueous suspensions, it has been known to improve the speed of sedimentation or filtration of aqueous suspensions by the addition of flocculation or filtration aids which are based on natural products, such as starch. In addition, synthetic high polymers such as polyacrylamides have also been used as effective flocculating or filtration aids, particularly for the clarification of aqueous suspensions as they are obtained in the paper industry. The advantage of polyacrylamide lies in a higher effectiveness and particularly in the uniform quality. A certain disadvantage of polyacrylamides is, however, the extensive dependence upon the pH of the suspension in order to effect good flocculation.

OBJECTS OF THE INVENTION

An object of the invention is the use of oxyalkylated polyacrylamides as flocculating agents for aqueous suspensions as they are obtained particularly in the paper industry.

Another object of the invention is the development of a process of clarification of aqueous suspensions consisting of contacting an aqueous suspension with an oxyalkylated polyacrylamide in order to form a floc and separating clarified water from said floc.

These and other objects of the present invention will become more apparent as the description thereof proceeds.

DESCRIPTION OF THE INVENTION

Surprisingly, it has now been found that the pH-dependence can be widely reduced, if oxyalkylated polyacrylamides are used as flocculating agent for aqueous suspensions. With a particular advantage the oxyalkylated polyacrylamides can be used as flocculating agents for the aqueous and preferably acidic suspensions which are obtained in the paper industry.

The amounts of addition of the flocculating agents may vary widely upon the suspension to be flocculated and are generally between 0.02 and 2 gm., based on 100 gm. of the solids. The flocculating agent may be added as solids or in an aqueous solution.

The invention therefore involves a process of clarification of aqueous suspensions consisting of contacting an aqueous suspension with an oxyalkylated polyacrylamide in order to form a floc and separating clarified water from said floc.

It has further been found that such oxyalkylated polyacrylamides are particularly effective if they contain oxyalkyl groups with 3 or 4 carbon atoms.

As starting material for the preparation of the oxyalkylated polyacrylamides, for instance, an acrylamide polymerized with a redox system in a known manner is used. Suitable polyacrylamides have, for instance, average molecular weights of between about 2 to 10 million.

The oxyalkylation of polyacrylamide is also effected in a known manner with alkylene oxides. Preparation methods for oxyalkylated polyacrylamides are, for instance, described in the German Pat. 925,130.

The amount of oxyalkyl groups in the products used may vary widely. It has, however, been found preferable to use such oxyalkylated polyacrylamide flocculating agents which contain 5% to 100%, preferably 10% to 80%, by weight of oxyalkyl groups, based on the polyacrylamide starting material.

The alkylene oxides used in the oxyalkylation of the polyacrylamides may have the formula

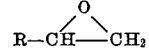

where R is a member selected from the group consisting of hydrogen, phenyl and alkyl having from 1 to 6 carbon atoms such as ethylene oxide, styrene oxide, hexylene oxide, etc. Preferably, however, R is methyl or ethyl such as propylene oxide and butylene oxide, that is alkylene oxides with three or four carbon atoms. The oxyalkylation reaction is carried out in the aqueous polymer solution or in a water-containing solvent mixture of the polyacrylamide with the use of alkaline oxyalkylation catalysts. The oxyalkylated polyacrylamides are precipitated from solution by the addition of alcohol or dioxane or recovered on belt or roller driers in order to rid them of the solvent or of water.

The oxyalkylated polyacrylamides, to be used in the clarification of aqueous suspensions according to the invention, are suitable in many technical fields for the flocculating of precipitates from aqueous suspensions. They may be used, for instance, in the clarification of sugar solutions, in the processing of water from ore or coal mining in order that the clarified water is fit for industrial use. They are particularly advantageous, however, as flocculating agents in the paper industry. They are effective at a pH of between 7 and 3 or 6 and 4, as it results in aqueous suspensions of wood pulp because of the addition of aluminum sulfate.

Essentially, the present invention involves a process for the clarification of all acidic industrial waste waters, that is waste waters with a pH of below 7, either together with a primary water-soluble inorganic coagulant such as alum (aluminum sulfate) or in its absence. The oxyalkylated polyacrylamides in essence are organic polyelectrolyte coagulants which are effective in acidic waters to form flocculation centers for the flocculation of primarily collodial material suspended in the acidic industrial waste waters. The amount of oxyalkylated polyacrylamide added to the acidic industrial waste waters for efficient flocculation depends on the amount of suspended solids contained therein. Usually the amounts employed are from 0.02 gm. to 2 gm. per 100 gm. of suspended solids or from 0.4 to 40 p.p.m. in the acidic industrial wastes. Flocculation is rapid and is usually complete in 1 to 30 minutes. Thereafter, the floc is filtered or settled and the clarified water obtained.

The effectiveness of the oxyalkylated polyacrylamides, to be used according to the invention, was tested on wood pulp suspensions. For the determination of the water removal behavior from wood pulp suspensions the following process was used. Dry fibrous material was distributed homogenously in water and flowed with a constant flow rate on a filter cloth of known dimensions and porosity. The speed with which the water penetrates through the filter cloth is a measure for the water removal behavior.

The filter cloth is appropriately placed in a cylindrical vessel which in its lower part has, in different heights, two discharge openings. In a slow rate of water removal (rate of filtration) the large part of the liquid leaves through the lower openings. By the addition of flocculating agents the rate of water removal is increased and thus the part of the liquid which flows through the upper opening.

The following examples are illustrative of the practice of the invention without, however, being limitative in any manner.

EXAMPLES

Preparation of the starting material 30 gm. of acrylamide were dissolved in 170 ml. of deionized water and freed of oxygen by agitation for 20 minutes in a strong stream of nitrogen. Then 3 mg. of sodium sulfite and 5 mg. of potassium peroxydisulfate, dissolved in water, were added, and after adjusting the pH of the reaction solution to 6.5 with sodium hydroxide, it was heated to 35° C. After 4 hours of polymerization at 35° C., the polymer solution which has a monomer content of 3% to 5%, could be reacted directly with the alkylene oxides. The specific viscosity of 0.1% of the isolated material dissolved in a 1 N sodium nitrate solution, was 2.3.

200 gm. of a 15% polyacrylamide solution were charged together with 3 gm. of sodium hydroxide in an autoclave. After adding 15 gm. of propylene oxide, a pressure of 3 atm. was set with the aid of nitrogen. The autoclave was heated to 80° C. and after 30 minutes the reaction was stopped. The contents of the autoclave were stirred into excess ethanol. The addition product precipitated. It had a specific viscosity of 2.0.

As described above, 30 gm. of polyacrylamide in a 15% aqueous solution was reacted with 15 gm. of butylene oxide with addition of 2 gm. of sodium hydroxide. Also in this case the reaction was carried out during about 30 minutes at 80° C. The isolation of the addition product was effected as described above. The adduct had a specific viscosity of 1.3.

EXAMPLE 1

Flocculation of a pulp suspension 100 gm. of mechanical wood pulp were suspended in 5 liter of tap water and pulverized in an impact apparatus. One liter of the suspension thus obtained was diluted with 9 liters of water and adjusted to a pH of 6 or 4.3 with aluminum sulfate. One liter of the thus obtained pulp suspension was flocculated with the addition of 4 ml. of a 0.1% solution of the flocculation agents described below in water in the Schopper-Riegler apparatus.

The following Schopper-Riegler values (leaflet V/7/61 of the Verein der Zellstoff-und Papier-Chemiker und Ingenieure) were measured:

| Flocculation agent | pH | |
|---|---|---|
| | 6 | 4.3 |
| Polyacrylamide | −20 | 0 |
| Propoxylated polyacrylamide | −38 | −32 |
| Butoxylated polyacrylamide | −38 | −26 |

EXAMPLE 2

Flocculation of a bentonite suspension 1.7 gm. of bentonite and 3.7 gm. of sodium chloride were added to 550 ml. of distilled water of 50° C. To this suspension each time 0.001 gm. of flocculating agent was added. The suspension was then poured into a pipe of 4 cm. diameter and 35 cm. height which was kept constantly at 50° C. by a heating jacket. As a measure for the flocculation effect, the rate of sedimentation in cm./sec. was measured with the following values:

(a) Polyacrylamide having a specific viscosity of 1.5:0.7 cm./sec.

(b) Propoxylated polyacrylamide having a specific viscosity of 2.0:1.1 cm./sec.

EXAMPLE 3

Flocculation of a pulp suspension

One liter samples of the pulp suspension described in Example 1 were adjusted to a pH of 6 or 4.3 by means of ferric sulfate.

Using propoxylated polyacrylamide or butoxylated polyacrylamide as flocculation agents the same Schopper-Riegler values were obtained as in Example 1.

EXAMPLE 4

Flocculation of a pulp suspension

One liter samples of the pulp suspension of Example 1 were adjusted to a pH of 6 or 4.3 with hydrochloric acid.

Using polyacrylamide or propoxylated polyacrylamide as flocculation agents the following Schopper-Riegler values were measured:

| Flocculation agent | pH | |
|---|---|---|
| | 6 | 4.3 |
| Polyacrylamide | 0 | 0 |
| Propoxylated polyacrylamide | −3 | −2 |

EXAMPLE 5

Flocculation of a preclarified neutral paper mill waste water 0.002 gm. of propoxylated polyacrylamide were added to one liter of the waste water at 25° C. The settling speed was measured at this temperature. It amounted to 1.3 centimeters per second.

When unmodified polyacrylamide was used as a flocculation agent in a comparative experiment the settling speed amounted only to 0.5 centimeter per second.

EXAMPLE 6

Flocculation of a suspended matter containing natural river water

One liter samples of the river water were treated at 25° C. with 0.002 gm. of polyacrylamide or propoxylated polyacrylamide. The settling speed measured as in Example 5 had the following values:

| Flocculation agent | pH | cm. per sec. |
|---|---|---|
| Polyacrylamide | 7 | 1.0 |
| Do | 5.3 | 0.9 |
| Propoxylated polyacrylamide | 7 | 1.3 |
| Do | 5.3 | 1.2 |
| Do | 9 | 1.3 |

The preceding specific embodiments are illustrative of the practice of the invention. It is to be understood, however, that other expedients known to those skilled in the art may be employed without departing from the spirit of the invention or the scope of the appended claims.

We claim:

1. A process of clarification of aqueous suspensions consisting of contacting an aqueous suspension with an oxyalkylated polyacrylamide in order to form a floc and separating clarified water from said floc.

2. The process of claim 1 wherein said aqueous suspensions are acidic industrial waste waters.

3. The process of claim 2 wherein said acidic industrial waste waters are aqueous acidic suspensions from the processing of paper.

4. The process of claim 1 wherein said oxyalkylated polyacrylamide is added to said aqueous suspension in an amount of from 0.02 gm. to 2 gm. per 100 gm. of suspended material in said aqueous suspension.

5. The process of claim 1 wherein said oxyalkylated polyacrylamide contains from 5% to 100% by weight of oxyalkyl units based on the polyacrylamide basic material.

6. The process of claim 5 wherein said oxyalkylated polyacrylamide contains from 10% to 80% by weight of oxyalkyl units based on the polyacrylamide basic material.

7. The process of claim 1 wherein said oxyalkylated polyacrylamide is oxyalkylated with an alkylene oxide having the formula

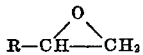

wherein R is a member selected from the group consisting of hydrogen, phenyl and alkyl having from 1 to 6 carbon atoms.

8. The process of claim 7 wherein said oxyalkylated polyacrylamide is a water-soluble polyacrylamide having an average molecular weight of from 2 to 10 million containing from 10% to 80%, based on said polyacrylamide of oxypropyl units.

9. The process of claim 7 wherein said oxyalkylated polyacrylamide is a water-soluble polyacrylamide having an average molecular weight of from 2 to 10 million containing from 10% to 80%, based on said polyacrylamide of oxybutyl units.

10. The process of claim 1 wherein said aqueous suspension contains a primary water-soluble inorganic coagulant.

References Cited

UNITED STATES PATENTS 2,975,124   3/1961   Caldwell et al. _____ 210—54
3,023,162   2/1962   Fordyce et al. _____ 210—54

MICHAEL ROGERS, Primary Examiner

U.S. Cl. X.R.

162—190; 210—54; 260—89.7